Figure 1:
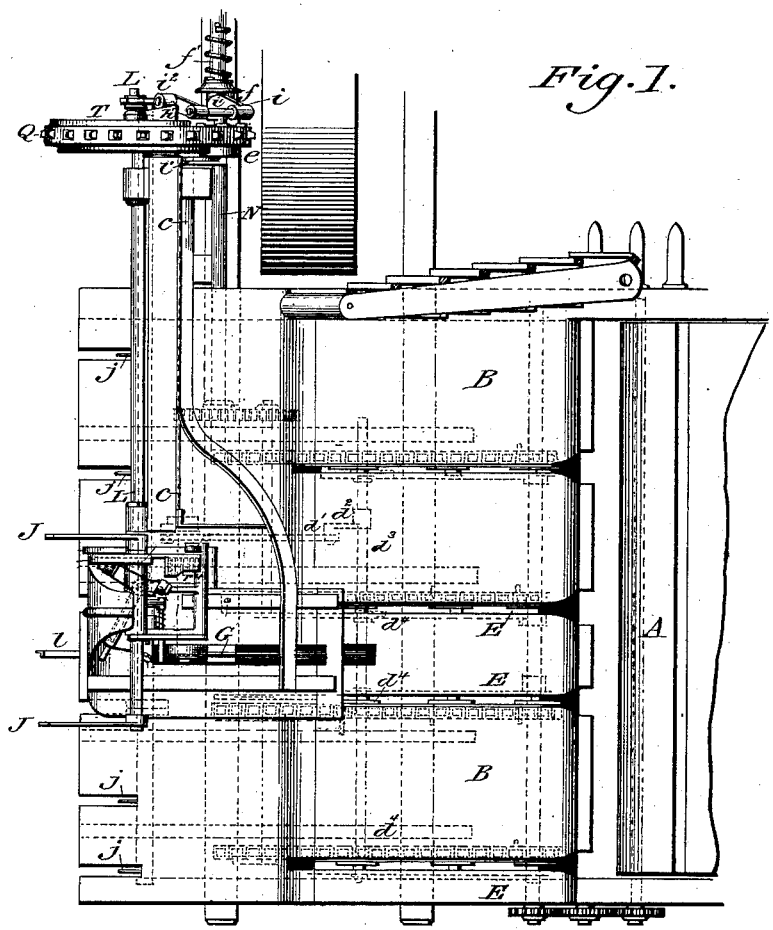

(No Model.)　　　　　　　　　　　　　　2 Sheets—Sheet 1.
J. HARRISON.
GRAIN BINDING HARVESTER.

No. 362,004.　　　　　　　　　Patented Apr. 26, 1887.

WITNESSES:　　　　　　　　　　　　　　INVENTOR (No Model.) 2 Sheets—Sheet 2.

J. HARRISON.
GRAIN BINDING HARVESTER.

No. 362,004. Patented Apr. 26, 1887.

Witnesses
H. W. Elmore
Edw. S. Hutchins

Inventor
John Harrison
By his Attorney
George Harding

N. PETERS, Photo-Lithographer, Washington, D. C.

UNITED STATES PATENT OFFICE.

JOHN HARRISON, OF CAREBY, STAMFORD, COUNTY OF LINCOLN, ENGLAND, ASSIGNOR TO THE WALTER A. WOOD MOWING AND REAPING MACHINE COMPANY, OF NEW YORK.

GRAIN-BINDING HARVESTER.

SPECIFICATION forming part of Letters Patent No. 362,004, dated April 26, 1887.

Application filed January 11, 1887. Serial No. 224,007. (No model.) Patented in England February 21, 1882, No. 852.

*To all whom it may concern:*

Be it known that I, JOHN HARRISON, a subject of the Queen of Great Britain, and a resident of Careby, Stamford, county of Lincoln, England, have invented a new and useful Improvement in Grain-Binding Harvesters, of which the following is a true and exact description, reference being made to the accompanying drawings, which form part of this specification.

My invention has for its object improvements in reaping and binding machines which automatically make the sheaves, according to previous adjustment, of uniform size, and relates to the arrangement and operation of the teeth which convey the grain from the platform to the binding apparatus, so that during the operation of binding a bundle of grain the conveying-teeth shall be rendered temporarily inoperative by receding from the grain, so that although the elevating-teeth continue their motion their action on the grain is suspended during the binding operation.

The platform of the reaping-machine is fitted with a traveling apron or other means for conveying the cut crop to one side, and also an incline, up which the crop is conveyed by endless chains with teeth projecting above the face of the incline, and I cause the teeth to be withdrawn below the face of the incline when the packing of the crop is to cease. I effect this by forming the teeth somewhat like the letter L. A small roller is mounted on a stud near the angle of the L, and the teeth are hinged to the pitch-chains at the end of one of the legs. A bar is placed relatively to the pitch-chains, so that the rollers on the teeth bear on the bar, and one leg of the L is thus made to project upward above the face of the incline. Now, by raising and lowering the bar I can cause the teeth to project more or less above the incline, or to disappear altogether below it. I find it convenient to mount the bars at the lower end upon the spindle which carries the pitch-chain wheels and move the other end of the bar only, the effect of which is to cause the teeth to disappear gradually as they approach the top of the incline.

In my invention I prefer to mount the binder-arm on an axis placed below the binding-table and the knotting apparatus at the top, (above the sheaf;) and the compressor-arm consists of several arms mounted on a separate axis. The binding-table is considerably inclined, and the compressor-arms are placed near the lower end of the same and so as to stand up at about right angles therewith. The crop, in being pushed over the upper end of the incline from the platform of the machine, is packed down against the compressor-arms by the teeth on the chains, and it is by this arrangement of the compressor that I effect the automatic sizing of the bundles. The spindle on which the compressor-arms are mounted has a crank-arm and a connecting-rod, the end of which is held in position by a cam-wheel on the knotter-shaft above. The connecting-rod has a slot, in which the pin in the crank-arm plays, so that the compressor-arms and spindle have a certain limited range of movement independent of the connecting-rod. This movement is made use of to shift a movable part of a cam on the cam-wheel above mentioned, and allows the spring-clutch, which drives the whole of the binding mechanism, to fall into gear. The yielding of the compressor-arms is regulated by a spring. The arms are also adjustable on the spindle, so that, the size of the sheaf being fixed by the setting of the arms, the bundles must all be packed equally tight before the compressor-arms yield and the binding begins. When the tying of the sheaf is completed, a depression in the cam causes the compressor-arms to fall and allow the sheaf to pass off the machine. A rotating arm on the knotter-shaft effects the discharge of the sheaf. As above stated, the binder-arm is mounted on a shaft below the binding-table and has a short circular movement for conveying the string upward through the crop to the knotter and returns in the same path, leaving a string behind it for the next bundle. The binder-arm, moving like a bent radius from its shaft, seizes the crop and forces it against the compressor-arms, and the divider is in this case merely a circular piece attached to or formed on the back of the binder-arm, and, being concentric with the shaft, holds the crop back so long as the binder-arm is above the table. On the binder-arm shaft is a crank-arm, which lowers the bar under the teeth of the pitch-chains at the moment when the binder-arm penetrates the crop. The teeth then do not appear above the face of the incline at the upper end and the packing action ceases; but the crop is still being straightened and laid evenly at the lower part of the incline, ready for the next advance. The motion of the binder-arm is derived from a cam on the knotter-shaft which takes hold of one end of a lever centered on the frame and having a toothed sector at the other end gearing with a sector on the binder-arm shaft. The cam is shaped so as to produce the requisite pauses and the reversal of the motion at the proper moments.

Figure 2:
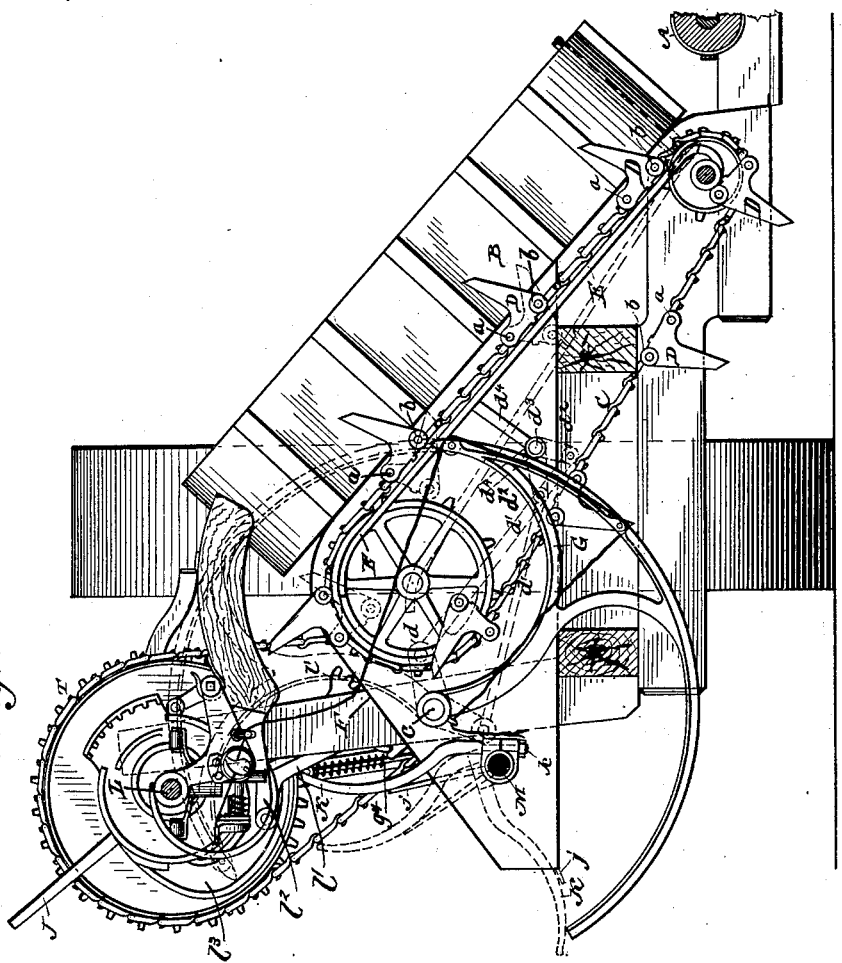
Figure 3:
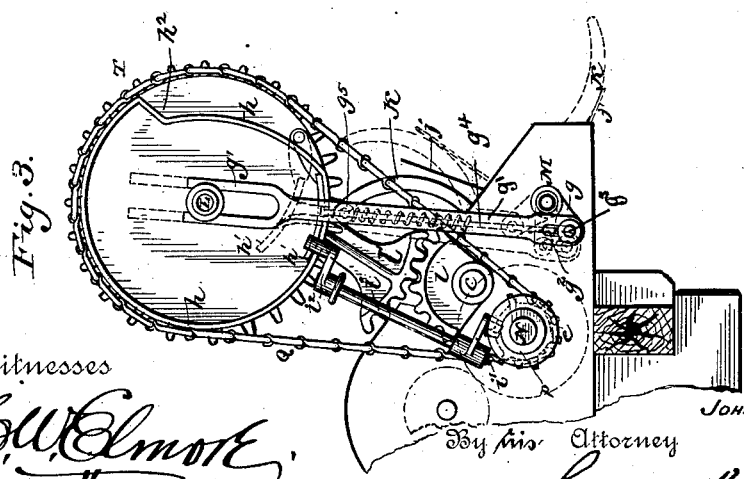

In the drawings which accompany and form part of this specification, Figure 1 is a plan view, and Fig. 2 is a front elevation. Fig. 3 is a side elevation of the binder-driving mechanism.

A is the platform; B, the incline; C, the pitch-chains with teeth D, which are pivoted to the chains at $a$ and have rollers at $b$.

E are the bars upon which the rollers $b$ run.

$c$ is the binder-arm shaft, and upon this shaft is the arm $d$, which is connected by the rod $d'$ with the arm $d^2$ on rock-shaft $d^3$, upon which are fixed the lifters $d^4$, for raising the bars E. The parts for raising and lowering the teeth are shown in dotted lines in the position when the teeth are lowered.

F is the binding-table, in this case considerably inclined.

G is the binder-arm, having the divider-bar formed upon it. The dotted lines show the position during the tying of the sheaf.

K are the compressor-bars, mounted upon the shaft M, and $j$ are bars mounted upon the same shaft at each side of the compressor-bars for retaining the ends of the sheaf.

$g$ is the crank on shaft M, and $g'$ is the connecting-rod with the slot $g^2$, in which the pin $g^3$ plays. The rod $g^4$ is attached to pin $g^3$, and has a spiral spring round it, which tends to force the connecting-rod $g^4$ downward, and also forms the resistance to the compressor-arms K, the limit of their independent range being the length of the slot $g^2$.

L is the knotter-shaft.

T is the driving-wheel, and having upon it the fixed cam-ring $h$ and the movable cam $h'$. When the pressure upon the compressor-arms overcomes the resistance of the spring, the rod $g^4$ rises and pushes up the cam $h'$ into the position shown in dotted lines.

N is the shaft which gives motion to the pitch-chains of the platform and incline.

Q is the pitch-chain connecting the shafts L and N.

$e$ is the driver-wheel, and $f$ the clutch, which is in this case automatically withdrawn by the cam $h'$ when a tied sheaf has just been discharged. The rocking shaft $i$ has an arm, $i'$, engaging the clutch $f$, and another arm, $i^2$, carrying a small roller which meets the movable cam $h'$. When the cam $h'$ is pushed from under the roller by the rod $g^4$, the spring $f'$ causes the clutch $f$ to snap into gear, and the binding mechanism starts. The wheel T, having made one revolution, has pushed the cam $h'$ beneath the roller on the arm $i^2$ of the rocking-shaft, and the clutch $f$ is again pulled out of gear and the binding mechanism stops.

The compressor-arms K are clamped to the shaft M by the nuts $k$, as shown in Fig. 2, for the purpose of adjusting the size of the sheaf. When the tying of the sheaf is just completed, the roller $g^5$ on the connecting-rod $g'$ arrives at the part $h^2$ of the cam $h$, when the compressor-arms K are allowed to fall out of the way and let the sheaf pass off the machine. During the further revolution of the wheel the roller $g^5$ rides on the cam $h$, and the rod $g'$ is thereby restored to its normal position, with the yielding compressors in position to receive another gavel. The dotted lines show the arms in the lowest position. J are the dischargers. The binder-arm shaft $c$ receives motion through the sector $l$, keyed upon it and gearing with the sector $l'$, which is centered upon the frame and has an arm, $l^2$, guided by the cam $l^3$, formed upon the driving-wheel T.

Having now described my invention, what I claim, and desire to protect by Letters Patent, is as follows:

1. In a grain-binding harvester, the combination of the continuously-operating platform-carrier, the binder, and the separate intermittingly-operating elevating and packing mechanism, said mechanism consisting of endless chains carrying pivoted teeth and running over wheels at top and bottom of the incline, tracks extending the length of and underlying the chains and adapted to hold the teeth projected above the floor of the incline, the tracks being pivoted at their lower ends at the axis of the lower wheels, and means connecting these tracks with the binder, whereby, when the binder is thrown into action, the tracks are withdrawn, so that those teeth at the upper end of the incline may be rendered entirely inactive, while those at the lower end are unaffected, and those intermediate are more or less inactive, according to their distance from the pivot of the track.

2. In combination, the pitch-chains C, having pivoted teeth D, the guide-bars E, the binder-arm shaft $c$, and the arm $d$, connecting-rod $d'$, arm $d^2$, rock-shaft $d^3$, and lifters $d^4$, for raising and lowering the bars E.

3. In the binding mechanism of a grain-binding harvester, the combination of the power-shaft, the binding mechanism, a clutch between the said shaft and binding mechanism, the adjustable yielding compressors, a rod capable of endwise motion connected therewith, the movable cam $h'$ on the driving-wheel, actuated by said rod, a rock-shaft, $i$, having arms $i'$ and $i^2$, which normally hold the clutch out of action, whereby a yielding of the compressor causes the rod to release the rock-shaft from the cam and allow the clutch to put the binding mechanism into operation.

4. The power-shaft, in combination with the binding mechanism of a grain-binding harvester, a clutch to connect the power-shaft with the binding mechanism, the wheel T of the binder, the cam $h$, attached to the wheel T and revolving with it, the yielding compressors, the endwise-moving rod connected therewith, the rock-shaft $i$, having the arms $i'$ and $i^2$, the former for throwing the clutch to arrest the action of the binder, and the latter being arranged in the path of the cam $h$, whereby the binding mechanism is automatically stopped when the binding of the bundle is completed.

5. In the binding mechanism of a grain-binding harvester, the combination of the pivoted compressors, the movable rod $g^4$, connecting therewith, the driving-wheel T of the binder, and the cam $h$ on said driving-wheel T acting on said rod $g^4$, whereby, when the rod is moved to its upward limit of motion and the binding mechanism started, the driving-wheel T in its revolution causes the cam $h$ to depress the rod $g^4$, returning it to its original position.

6. In a grain-binding harvester, the combination of compressors K, lever $g$, connecting-rod $g'$, having slot $g^2$, rod $g^4$, a spring to act upon the rod $g^4$, and cam $h'$, rock-shaft $i$, having arms $i'$ and $i^2$, said arm $i^2$ having a roller, clutch $f$, a power-shaft carrying said clutch, and driver-wheel $e$, connecting with said clutch, substantially as and for the purpose described.

7. In a grain-binding harvester, the combination of the operating-wheel T, the cam $h$ thereon, the compressors K, the actuating-rod $g^4$, and a roller, $g^5$, on said rod, against which the cam works, substantially as and for the purpose described.

JOHN HARRISON.

Witnesses:
HENRY GARDNER,
*Patent Agent*, 166 *Fleet Street, London, England.*
RICHARD CORE GARDNER,
*His Clerk.*